(12) United States Patent
Herman et al.

(10) Patent No.: US 7,937,220 B2
(45) Date of Patent: *May 3, 2011

(54) GENERATING DIGITAL TERRAIN MODELS REPRESENTING SUB-SURFACE STRATA

(75) Inventors: Glen A. Herman, Olathe, KS (US); Cecil G. Law, Peculiar, MO (US); Kevin R. Hale, Parkville, MO (US)

(73) Assignee: HNTB Holdings Ltd, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/857,842

(22) Filed: Aug. 17, 2010

(65) Prior Publication Data
US 2010/0312528 A1 Dec. 9, 2010

Related U.S. Application Data

(63) Continuation of application No. 11/548,163, filed on Oct. 10, 2006, now Pat. No. 7,792,643.

(60) Provisional application No. 60/803,823, filed on Jun. 2, 2006.

(51) Int. Cl.
*G01V 3/38* (2006.01)
*G01V 1/00* (2006.01)
*G06F 17/50* (2006.01)

(52) U.S. Cl. ................. 702/5; 367/73; 703/1
(58) Field of Classification Search ........... 702/5, 1–2, 702/6, 11, 14, 16, 67, 150, 167; 703/1, 5; 709/238; 367/68–69, 73; 345/440, 442, 345/501, 520, 522, 581, 619; 715/200–201, 204, 211, 215, 255, 273, 277, 700, 748
See application file for complete search history.

(56) References Cited

U.S. PATENT DOCUMENTS

| | | | |
|---|---|---|---|
| 7,792,643 B2 * | 9/2010 | Herman et al. | 702/5 |
| 2006/0020431 A1 * | 1/2006 | Gipps et al. | 703/1 |

OTHER PUBLICATIONS

Hack et al., Three and More Dimensional Modelling in Geo-Engineering, Published Online: Dec. 14, 2005, Bull Eng Geol Env (2006), vol. 65, pp. 143-153.*

* cited by examiner

*Primary Examiner* — Michael P Nghiem
*Assistant Examiner* — Toan M Le
(74) *Attorney, Agent, or Firm* — Shook, Hardy & Bacon L.L.P.

(57) ABSTRACT

Integrated computing systems and methods for applying sub-surface material location and composition information to engineering plans for designing, highways and other roadways, are provided. Utilizing the described systems and methods, surfaces, highways, may be more efficiently designed in a timely fashion, requiring less format conversion for inputs and outputs to be compatible throughout the design process. Additionally, adjustments for changes in alignments for the desired surfaces are more easily taken into account than in conventional design systems, permitting quicker design corrections and more accurate results.

20 Claims, 4 Drawing Sheets

GENERATING DIGITAL TERRAIN MODELS REPRESENTING SUB-SURFACE STRATA

CROSS-REFERENCE TO RELATED APPLICATIONS

This application is a continuation of and claims the benefit of priority to U.S. patent application Ser. No. 11/548,163, filed on Oct. 10, 2006, entitled "GENERATING DIGITAL TERRAIN MODELS REPRESENTING SUB-STRATUM SURFACES," now U.S. Pat. No. 7,792,643, which claims the benefit of U.S. Provisional Application No. 60/803,823, filed Jun. 2, 2006, entitled "Method and System for Handling and Using Boring Sample Data." Both U.S. patent application Ser. No. 11/548,163 and U.S. Provisional Application No. 60/803,823 are hereby incorporated by reference.

STATEMENT REGARDING FEDERALLY SPONSORED RESEARCH OR DEVELOPMENT

Not Applicable.

BACKGROUND

Traditionally, producing plans for highway (and other roadway) design involves a number of individual computing programs. Often, the inputs and/or outputs of one program must be converted to a different format in order to be compatible with other programs. For instance, in one aspect, roadway design involves extracting boring samples from a plurality of locations within a geographical boundary of interest (e.g., a highway design corridor) to determine sub-surface geologic composition. The boring samples may then be utilized to create boring logs which may subsequently be plotted in a number of different ways to produce graphical representations of the geotechnical data within the geographical boundary. One way in which such graphical representations may be produced is by utilizing a series of programs in the PLBORING family of programs. Converting the graphical representations (e.g., produced utilizing one or more of the PLBORING programs) to a format that complies with a multitude of varying standards, whether government regulated or imposed by preference, is an additional step that may involve, for instance, a VAX-based family of programs.

To further illustrate the point, a DOS-based program, e.g., gINT, may be utilized during the above process to produce an electronic version of the boring logs. However, in this instance, the gINT input must be converted to a format compatible with the VAX in order to make use of the PLBORING family of programs.

In view of the above, it can be readily appreciated that producing highway design plans utilizing all of these initially non-compatible programs, and making them compatible with one another, is a time-consuming and manually intensive process. Further, personnel that are trained and efficient in using all of the individual programs are limited, further exacerbating the timing issue.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Integrated computing systems and methods for applying sub-surface material location and composition information to engineering plans for designing, e.g., highways and other roadways, are described herein. Utilizing the described systems and methods, surfaces, such as highways, may be more efficiently designed in a timely fashion, requiring less format conversion for inputs and outputs to be compatible throughout the design process. Additionally, adjustments for changes in alignments for the desired surfaces (e.g., roadways) are more easily taken into account than in conventional design systems, permitting quicker design corrections and more accurate results.

Accordingly, embodiments of the present invention relate to methods, in an integrated computing environment, for generating a digital terrain model (DTM) representing one or more sub-surface strata within a geographical boundary, e.g., a highway design corridor. In one embodiment, the method includes receiving boring log data from a plurality of borings, each of the plurality of borings representing a location within the geographical boundary; receiving ground surface information (e.g., one or more ground surface DTMs) associated with the geographical boundary; receiving data representing a horizontal alignment; and generating a DTM representing the one or more sub-surface strata within the geographical boundary.

Further embodiments of the present invention relate to computerized systems for applying information associated with at least one sub-stratum surface within a geographical boundary to an engineering plan for designing a surface (e.g., a highway or other roadway). In one embodiment, the system includes a boring log receipt module configured to receive boring log data from a plurality of borings, each of the plurality of borings representing a location within the geographical boundary and including information associated with the at least one sub-stratum surface; a ground surface model receipt module configured to receive at least one ground surface digital terrain model associated with the geographical boundary; and a plan receipt module configured to receive the engineering plan for designing the surface, the engineering plan including horizontal alignment data.

Embodiments of the present invention further include computer-readable media having computer-executable instructions embodied thereon for performing methods in an integrated computing environment for generating a geologic profile representing one or more sub-surface strata within a geographical boundary (e.g., a highway design corridor). In one embodiment, the method includes receiving boring log data from a plurality of borings, each of the plurality of borings representing a location within the geographical boundary and including geologic information associated with the one or more sub-surface strata; receiving at least one ground surface DTM associated with the geographical boundary; and generating the geologic profile representing the one or more sub-surface strata.

Additional embodiments of the present invention include user interfaces embodied on at least one computer-readable medium and executable on a computing device, the user interfaces for displaying geologic profile models. In one embodiment, the user interface includes a first display area configured to display at least one boring log indicator; and a second display area configured to display at least one geologic profile, wherein at least a portion of the first display area and at least a portion of the second display area overlap with one another.

BRIEF DESCRIPTION OF THE SEVERAL VIEWS OF THE DRAWINGS

Embodiments of the present invention are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide integrated computing systems and methods for applying sub-surface material location and composition information to engineering plans for designing surfaces, e.g., highways and other roadways. Utilizing the described systems and methods, highways and roadways may be more efficiently designed in a timely fashion, requiring less format conversion for inputs and outputs to be compatible throughout the design process. Additionally, adjustments for changes in alignments for the desired surfaces are more easily taken into account than in conventional design systems, permitting quicker design corrections and more accurate results.

Having briefly described an overview of the present invention, an exemplary operating environment for the present invention is described below.

Figure 1:
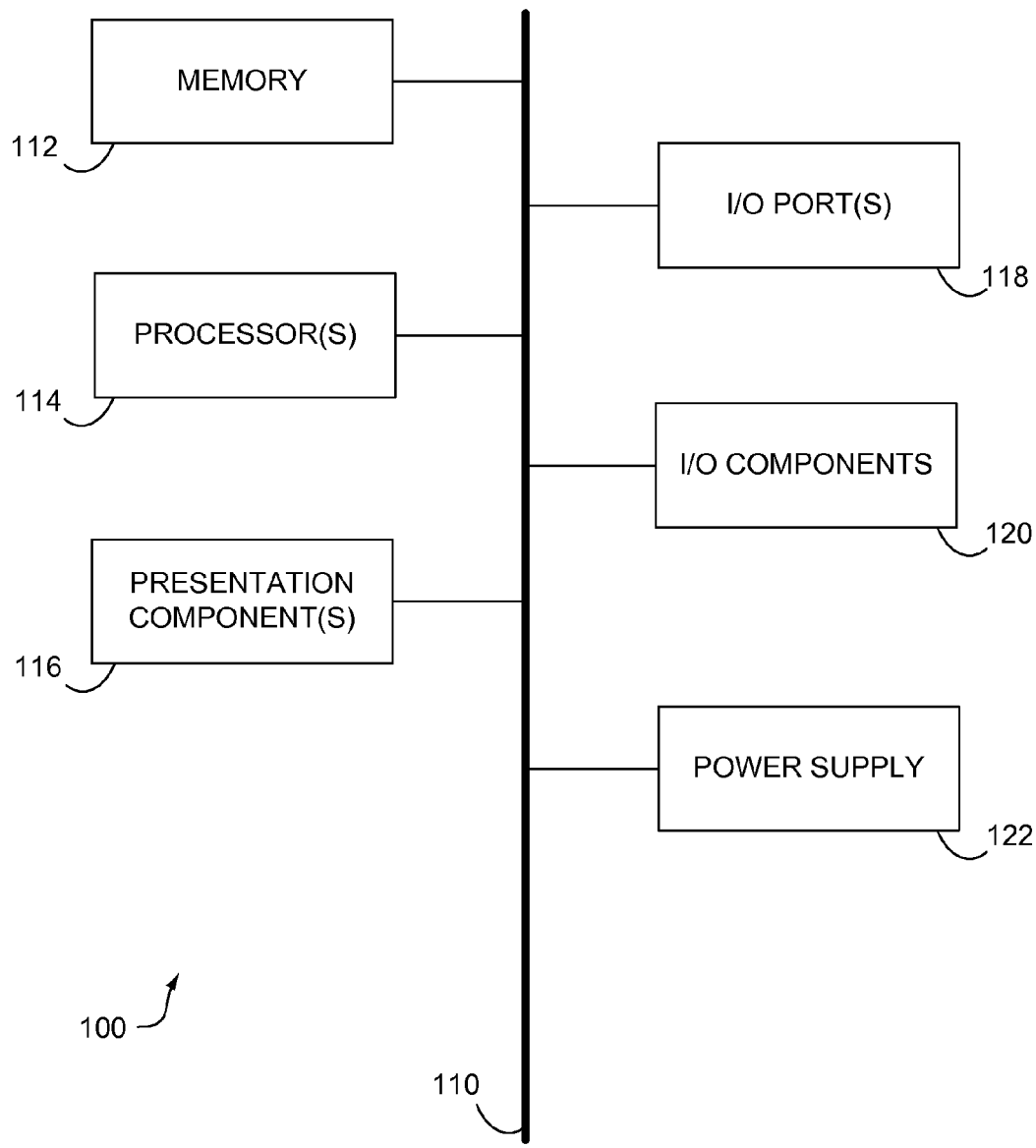
FIG. 1 is a block diagram of an exemplary computing environment suitable for use in implementing embodiments of the present invention.

Referring to the drawings in general, and initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, and the like. I/O ports 118 allow computing device 100 to be logically coupled to other devices including I/O components 120, some of which may be built in. Illustrative components include a microphone, joystick, game pad, satellite dish, scanner, printer, wireless device, and the like.

Figure 2:
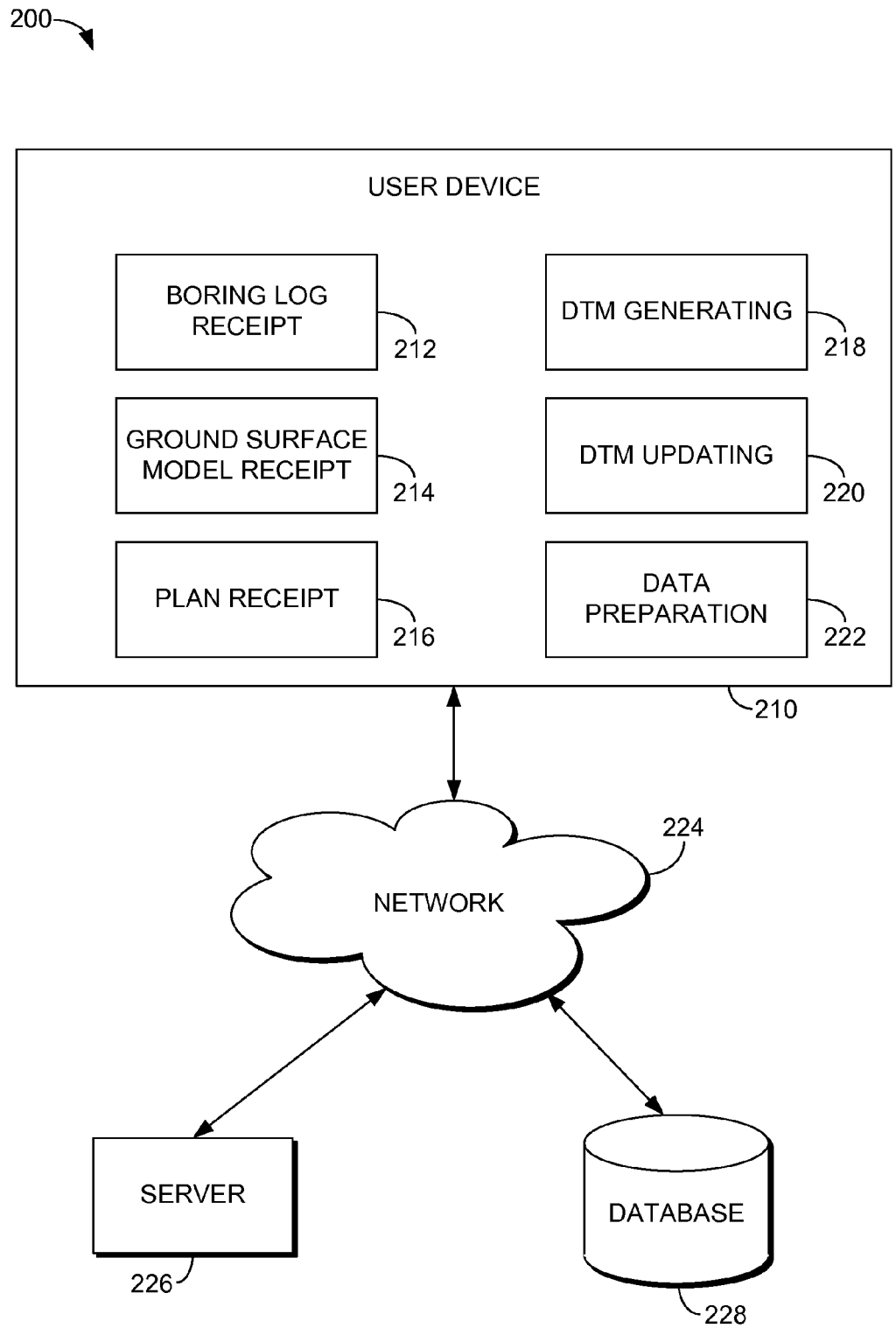
FIG. 2 is a block diagram showing an illustrative computerized system for applying information associated with at least one sub-surface stratum within a geographical boundary to an engineering plan for designing a surface (e.g., a highway or other roadway), in accordance with an embodiment of the present invention.

Turning now to FIG. 2, a block diagram is shown illustrating an exemplary integrated computing system 200 for applying information associated with at least one sub-surface stratum within a geographical boundary of interest to an engineering plan for designing a surface (e.g., a highway or other roadway), in accordance with an embodiment of the present invention. System 200 includes a user computing device 210, a server 226 and a database 228, the database being configured as a data repository. (It will be understood that database 228 may be integrated within the user computing device 210 rather than provided as an external component, if desired.) Each of the user computing device 210 and the server 226 may be any type of computing device, such as computing device 100 described with reference to FIG. 1, for example.

The user computer 210, the server 226, and the database 228 are in communication with one another via a network 224, which may include, without limitation, one or more local area networks (LANs) and/or wide area networks (WANs). Such networking environments are commonplace in offices, enterprise-wide computer networks, intranets, and the Internet. It will be understood and appreciated by those of ordinary skill in the art that any number of user computing devices, servers, databases, and networks may be employed within system 200 within the scope of embodiments of the present invention and that the illustrated embodiment is merely exemplary. In fact, all necessary information may be input directly into the user computing device 210 without the need for a network 224, server 226, or external database 228 at all. Additionally, other components not shown may also be included within the system 200 in accordance with embodiments hereof.

User computing device 210 includes a boring log receipt module 212, a ground surface model receipt module 214, an engineering plan receipt module 216, a digital terrain model (DTM) generating module 218, a DTM updating module 220, and a data preparation module 222. It will be understood and appreciated by those of ordinary skill in the art that the modules illustrated in the user computing device 210 of FIG. 2 are shown by way of example only and that user computing devices having fewer than all of the illustrated modules, as well as user computing devices having additional modules that are not shown, are contemplated to be within the scope of embodiments of the present invention.

Boring log receipt module 212 is configured to receive boring log data from a plurality of borings, each of the borings representing a location within a geographical boundary of interest. For instance, in designing a roadway, a geographical boundary resembling a corridor having outer limits which exceed the dimensions of the roadway by a predetermined distance may comprise the geographical boundary of interest. To gain an understanding of the sub-surface material location and composition within the geographical boundary of interest, a plurality of boring samples may be collected from various point locations within the boundary. Each of the point locations may be defined by at least two coordinates (e.g., an X coordinate and a Y coordinate) or defined relative to a baseline, for instance, by station and offset. The samples may then be utilized to generate boring logs, i.e., reports, that include text and/or graphics specifying material type classifications and locations. In embodiments, the boring log receipt module 212 may be configured to receive the boring logs. Additionally, the boring log receipt module 212 may be configured to re-define the point location of one or more borings as a coordinate location where such point locations are provided relative to a baseline.

If desired, the boring logs may be plotted such that they may be presented according to particular requirements. For instance, the boring logs may be plotted such that they may be graphically displayed on a display device (not shown) associated with the user computing device 210 in plan, profile, and/or section. In embodiments, the boring logs may be plotted and graphically displayed in association with a profile and/or a section view, as more fully described below with reference to FIG. 5. Plotting of the boring log data is useful in surface design as it permits extrapolation of data between the point locations of the borings. Though not illustrated in FIG. 2, system 210 may include a boring log plotting module configured to plot the received boring logs. Alternatively, the boring log receipt module 212 may be configured not only to receive the boring log data but also to plot the received data as desired. Any and all such variations, and any combination thereof, are contemplated to be within the scope of embodiments of the present invention.

The ground surface model receipt module 214 is configured to receive ground surface information associated with the geographical boundary of interest. Ground surface information may be represented, for example, as one or more DTMs providing a three-dimensional representation of the ground line as it exists in the geographical boundary of interest prior to implementation of the surface being designed. Providing the system with the dimensions and contour of the ground line over which a surface is to be designed permits greater accuracy in the roadway design and allows changes in horizontal alignments to be made without having to gather and input new data, as more fully described below.

At times, the ground surface information may indicate one or more material outcrops comprised of a material included in a sub-surface stratum of interest. In such circumstances, systems according to embodiments of the present invention are configured to take into account these material outcrops and recognize and adequately account for intersection of a material outcrop with the ground line, as more fully described below.

The engineering plan receipt module 216 is configured to receive the design data associated with the desired surface. Accordingly, the engineering plan receipt module 216 is configured to receive data representing the horizontal alignment of the surface being designed. The horizontal alignment data provides a reference point for the borings such that the sub-surface material composition that may affect the surface design may be more readily understood. Horizontal alignment data received by the engineering plan receipt module 216 may be user-created data, data imported into the system 200, or any combination thereof. Additionally, horizontal alignment data representing a plurality of horizontal alignments may be received, if desired, and utilized in generating a digital terrain model, as more fully described below.

Horizontal alignment data often times includes at least one endpoint defined by the boring log data. That is, horizontal alignments are often generated such that they begin and end with the actual point location of a boring sample and define a corridor there between. In some instances, it may be desirable to extend the corridor transverse to the horizontal alignment. In this regard, the illustrated system 200 is configured to extend the corridor transverse to the horizontal alignment without receipt of additional boring log data (e.g., false or "dummy" boring log data or the like). Accordingly, the engineering plan receipt module 216 may be configured to perform such corridor "widening" or a separate module (not shown) housed on either the user computing device 210 or a server 226 accessible through the network 224 may be provided. Any and all such variations, and any combination thereof, are contemplated to be within the scope of embodiments of the present invention.

The DTM generating module 218 is configured to generate a digital terrain model (DTM) that represents the material composition of at least one sub-surface stratum (that is, at least one sub-surface layer) with the geographical boundary of interest. The DTM generating module 218 takes into account the boring log data received through the boring log receipt module 212, the ground surface information received through the ground surface model receipt module 214, and the horizontal alignment data received through the engineering plan receipt module 216 in generating the representative DTM.

The DTM updating module 220 is configured to update any DTM generated by the DTM generating module if boring log data, ground surface information, or horizontal alignment data that was utilized in generating the DTM is modified. For instance, during the surface design process, the parameters of the geographical boundary of interest may be modified if the boring log data indicates a material composition that may cause a problem if the design proceeds as originally desired. Upon modifying the horizontal alignment, and receipt of the modification by the engineering plan receipt module 216, the DTM updating module 220 is configured to generate an updated DTM taking into account the modified horizontal alignment data. For instance, as the horizontal alignment data provides a reference point for the borings, upon receipt of updated horizontal alignment data, the boring log data associated with the DTM may be transferred and utilized to generate an updated DTM. It will be understood and appreciated by those of ordinary skill in the art that the DTM generating module 218 and DTM updating module 220 may not be two separate modules as illustrated but may be presented as a single module capable of generating original and updated DTMs. Any and all such variations are contemplated to be within the scope of embodiments of the present invention.

In addition to generating DTMs representing the material composition of at least one sub-surface stratum within a geographical boundary of interest, the illustrated system 200 is capable of preparing data for use in, e.g., determining the volume of a given material present in the sub-surface stratum and/or preparing data for generating surface contour maps and the like. As such, the user computing device 210 additionally includes a data preparation module 222. The data preparation module 222 is configured to utilize the boring log data received by the boring log receipt module 212, as well as any necessary extrapolations between boring log point locations, to prepare data for a variety of purposes including, but not limited to, determining the volume of a given material in the at least one sub-surface stratum, preparing data for generating surface contour maps and/or other graphical and or quantity-determining purposes.

Additionally, as previously discussed, occasionally the ground surface information may indicate the presence of at least one material outcrop that is comprised of a material included in at least one sub-surface stratum. In such circumstances, the data preparation module 222 may be additionally configured to take into account the volume of material in the outcrop (which may be input or imported from a volume determining external application or module), as well as the sub-surface material volume (which, again, may be input or imported from an appropriate external application or module), in preparing the data to determine the overall material composition.

Figure 3:
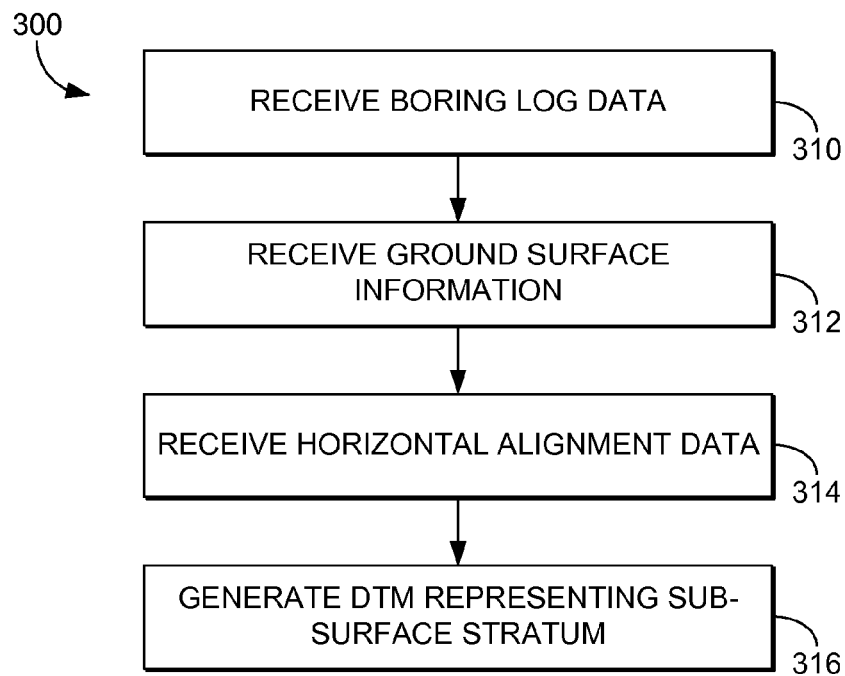
FIG. 3 is a flow diagram showing a method, in an integrated computing environment, for generating a digital terrain model (DTM) representing at least one sub-surface stratum within a geographical boundary (e.g., a highway design corridor), in accordance with an embodiment of the present invention.

With reference to FIG. 3, a flow diagram is illustrated showing an exemplary method 300, in an integrated computing environment, for generating a digital terrain model (DTM) representing at least one sub-surface stratum within a geographical boundary of interest (e.g., a highway design corridor), in accordance with an embodiment of the present invention. Initially, as shown at block 310, boring log data is received (e.g., by boring log receipt module 212 of FIG. 2). The boring log data relates to a plurality of borings, each of the plurality of borings representing a location within the geographical boundary and including information associated with the at least one sub-surface stratum. As previously mentioned, such boring log data may be received directly or received in a plotted format for presentation, as desired.

Next, ground surface information associated with the geographical boundary of interest is received (e.g., by ground surface model receipt module 214 of FIG. 2), as shown at block 312. In one embodiment, the ground surface information may be provided by virtue of one or more DTMs. Subsequently, as indicated at block 314, horizontal alignment data representing one or more horizontal alignments is received (e.g., by engineering plan receipt module 216 of FIG. 2). The horizontal alignment data may include user-created data or data imported from one or more external applications or modules. It will be understood and appreciated by those of ordinary skill in the art that the method steps shown in blocks 310, 312 and 314 may be completed in any successive order, simultaneously, or any combination thereof within the scope of embodiments of the present invention.

Subsequently, as indicated at block 316, a digital terrain model is generated representing the at least one sub-surface stratum within the geographical boundary of interest. The DTM may be generated, for instance, by DTM generating module 218 of FIG. 2, taking into account the boring log data, ground surface information and horizontal alignment data.

Figure 4:
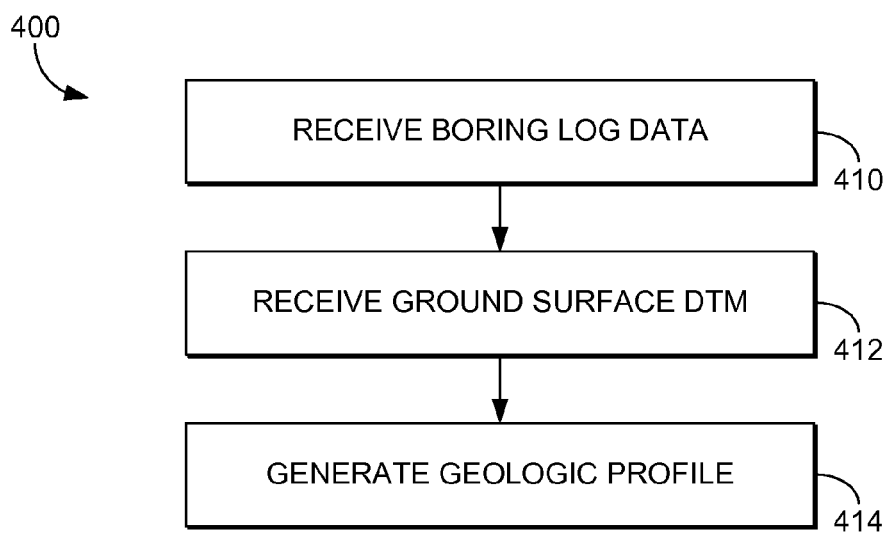
FIG. 4 is a flow diagram showing a method, in an integrated computing environment, for generating a geologic profile representing at least one sub-surface stratum within a geographical boundary, in accordance with an embodiment of the present invention.

Referring now to FIG. 4, a flow diagram is illustrated showing an exemplary method 400, in an integrated computing environment, for generating a geologic profile representing at least one sub-surface stratum within a geographical boundary of interest, in accordance with an embodiment of the present invention. Initially, as indicated at block 410, boring log data is received (e.g., by boring log receipt module 212 of FIG. 2). The boring log data relates to a plurality of borings, each of the plurality of borings representing a location within the geographical boundary and including information associated with the at least one sub-surface stratum. As previously mentioned, such boring log data may be received directly or received in a plotted format for presentation, as desired.

Next, as indicated at block 412, one or more ground surface DTMs is received, the ground surface DTM being associated with the geographical boundary of interest. The ground surface DTM(s) may be received, for instance, by ground surface model receipt module 214 of FIG. 2. Subsequently, a geologic profile representing the material composition of the at least one sub-surface stratum may be generated, e.g., by data preparation module 222 of FIG. 2. This is indicated at block 414.

Figure 5:
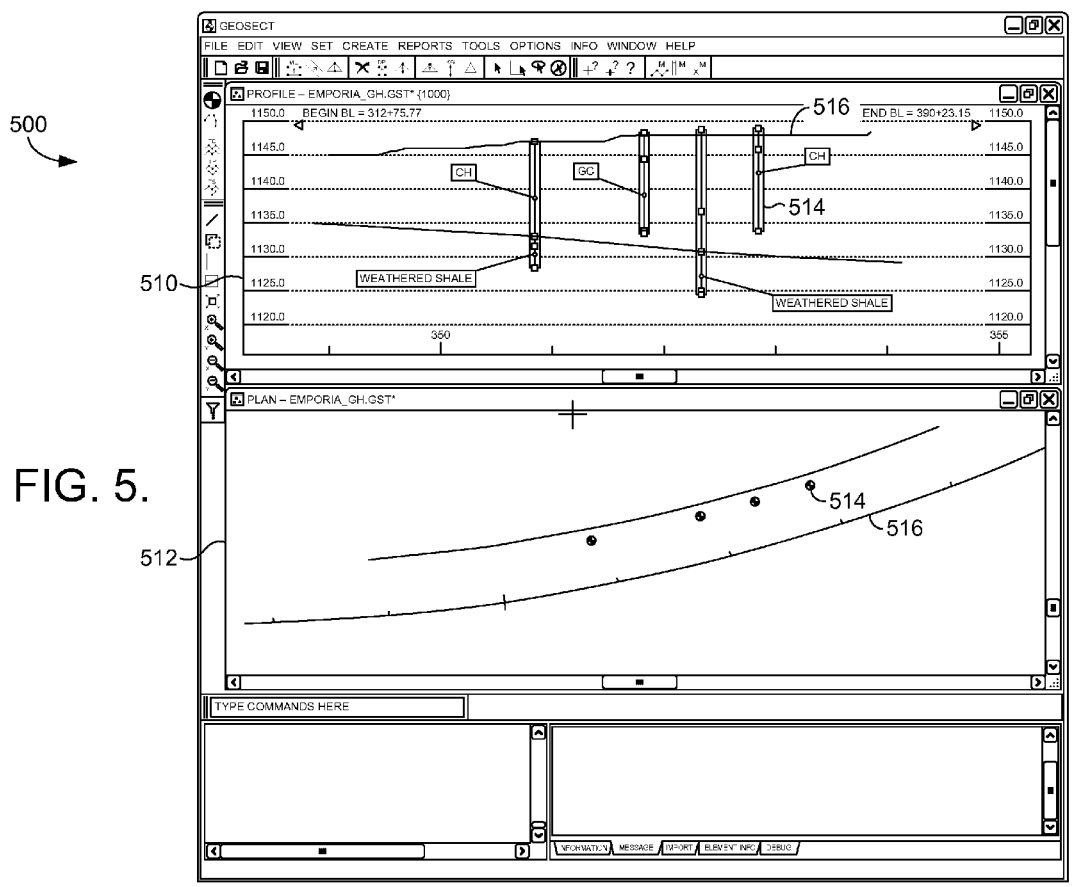
FIG. 5 is an illustrative screen display of an exemplary user interface configured to simultaneously display a geologic profile and boring log indicators, in accordance with an embodiment of the present invention.

Turning now to FIG. 5, an illustrative screen display of an exemplary user interface configured to simultaneously display at least one geologic profile and boring log indicators is shown and designated generally as reference numeral 500. It will be understood by one of ordinary skill in the art that screen display 500 is shown by way of example only and is not intended to limit the scope of embodiments of the present invention in any way.

Screen display 500 includes a side view display area 510 and a top view display area 512. Each of the side view display area 510 and the top view display area 512 include boring log indicators 514 and a geologic profile 516 thereon. Simultaneous display of both boring log indicators 514 and a geologic profile 516 permits the user to view surface contours and material composition at the same time and to effectively connect points to one another in designing a desired surface.

It will be understood by those of ordinary skill in the art that each of the side view display area 510 and the top view display area 512 may be displayed independent of one another within the scope of embodiments of the present invention Likewise, additional views of the geologic profile which illustrate both boring log indicators and surface contours, though not shown, are within the scope of embodiments hereof.

As can be understood, embodiments of the present invention provide integrated computing systems and methods for applying sub-surface material location and composition information to engineering plans for designing surfaces, e.g., highways and other roadways. Utilizing the described systems and methods, surfaces may be more efficiently designed in a timely fashion, requiring less format conversion for inputs and outputs to be compatible throughout the design process. Additionally, adjustments for changes in alignments for the desired surfaces are more easily taken into account than in conventional design systems, permitting quicker design corrections and more accurate results.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A user interface embodied on a non-transitory computer-readable medium and executable on a computing device, the user interface for displaying geologic profile models, comprising:
    a first display area configured to display a side view of at least one boring log indicator and a side view of at least one geologic profile; and
    a second display area configured to display a top view of the at least one boring log indicator and a top view of the at least one geologic profile, wherein at least a portion of the first display area and at least a portion of the second display area overlap with one another, thereby allowing a user to view surface contours and material composition at the same time and to effectively connect points to one another, wherein the surface contours are generated partly based on an engineering plan for designing a surface, the engineering plan including a horizontal alignment data for the surface, and wherein a horizontal alignment for the surface is displayed in the second display area.

2. The user interface of claim 1, wherein the surface is a road surface.

3. The user interface of claim 1, wherein the first display area depicts at least one sub-surface stratum.

4. The user interface of claim 1, wherein item locations in the first display area and item locations in the second display area are defined relative to a baseline.

5. The user interface of claim 1, wherein item locations in the first display area and item locations in the second display area are defined by at least two coordinates.

6. The user interface of claim 1, wherein the horizontal alignment includes a corridor defined by at least two endpoints included in boring log data.

7. The user interface of claim 6, wherein the corridor is extended transverse to the horizontal alignment without receiving additional boring log data.

8. One or more non-transitory computer-readable media having computer-executable instructions embodied thereon that be executed by a computing device performs a method for generating a digital terrain model, the method comprising:
    receiving boring log data from a plurality of borings, each of the plurality of borings representing a location within a geographical boundary;
    receiving ground surface information associated with the geographical boundary;
    receiving data representing a horizontal alignment of a surface; and
    generating a digital terrain model depicting a representation of a side view of at least one boring log indicator and a side view of at least one geologic profile wherein the digital terrain model also depicts a top view of the at least one boring log indicator and a top view of the at least one geologic profile, wherein at least a portion of the side view and at least a portion of the top view overlap with one another, thereby allowing a user to view surface contours and material composition at the same time and to effectively connect points to one another, wherein the surface contours are generated partly based on an engineering plan for designing the surface, the engineering plan including a horizontal alignment data for the surface.

9. The one or more non-transitory computer-readable media of claim 8, wherein the surface is a road surface.

10. The one or more non-transitory computer-readable media of claim 8, wherein the side view depicts at least one sub-surface stratum.

11. The one or more non-transitory computer-readable media of claim 8, wherein item locations in the side view and item locations in the top view are defined relative to a baseline.

12. The one or more non-transitory computer-readable media of claim 8, wherein item locations in the side view and item locations in the top view are defined by at least two coordinates.

13. The one or more non-transitory computer-readable media of claim 8, wherein the horizontal alignment includes a corridor defined by at least two endpoints included in boring log data.

14. The one or more non-transitory computer-readable media of claim 13, wherein the corridor is extended transverse to the horizontal alignment without receiving additional boring log data.

15. A method for generating a digital terrain model, the method comprising:
    receiving boring log data from a plurality of borings, each of the plurality of borings representing a location within a geographical boundary;
    receiving ground surface information associated with the geographical boundary;
    receiving data representing a horizontal alignment of a surface; and
    generating, using a computing device, a digital terrain model depicting a representation of a side view of at least one boring log indicator and a side view of at least one geologic profile wherein the digital terrain model also depicts a top view of the at least one boring log indicator and a top view of the at least one geologic profile, wherein at least a portion of the side view and at least a portion of the top view overlap with one another, thereby allowing a user to view surface contours and material composition at the same time and to effectively connect points to one another, wherein the surface contours are generated partly based on an engineering plan for designing the surface, the engineering plan including a horizontal alignment data for the surface.

16. The method of claim 15, wherein the surface is a road surface.

17. The method of claim 15, wherein the side view depicts at least one sub-surface stratum.

18. The method of claim 15, wherein item locations in the side view and item locations in the top view are defined relative to a baseline.

19. The method of claim 15, wherein the horizontal alignment includes a corridor defined by at least two endpoints included in boring log data.

20. The method of claim 19, wherein the corridor is extended transverse to the horizontal alignment without receiving additional boring log data.

* * * * *